United States Patent [19]

Aota

[11] Patent Number: 5,672,146

[45] Date of Patent: Sep. 30, 1997

[54] EAF DUST TREATMENT

[75] Inventor: Jay Aota, Kanata, Canada

[73] Assignee: Her Majesty the Queen in right of Canada, as represented by the Minister of Energy, Mines and Resources Canada, Ottawa, Canada

[21] Appl. No.: 363,929

[22] Filed: Dec. 27, 1994

[30] Foreign Application Priority Data

Dec. 1, 1994 [CA] Canada .................................. 2137090

[51] Int. Cl.⁶ ........................................... B09B 3/00
[52] U.S. Cl. ........................................... 588/256; 588/252
[58] Field of Search ........................... 588/252, 256, 588/257

[56] References Cited

U.S. PATENT DOCUMENTS

| | | | |
|---|---|---|---|
| 4,911,757 | 3/1990 | Lymm et al. | 106/85 |
| 4,946,811 | 8/1990 | Tuovinen et al. | 501/155 |
| 5,013,532 | 5/1991 | Sresty | 423/88 |
| 5,166,109 | 11/1992 | Alpert et al. | 501/155 |
| 5,175,134 | 12/1992 | Kaneko et al. | 501/155 |
| 5,177,305 | 1/1993 | Pichat | 588/256 X |
| 5,186,742 | 2/1993 | Hoffman et al. | 75/773 |
| 5,245,121 | 9/1993 | Gall et al. | 588/252 X |
| 5,245,122 | 9/1993 | Smith et al. | 588/257 |
| 5,362,319 | 11/1994 | Johnson | 588/252 X |
| 5,434,333 | 7/1995 | Jantzen et al. | 588/252 X |

FOREIGN PATENT DOCUMENTS

| | | |
|---|---|---|
| 1248557 | 3/1989 | Canada . |
| 2033342 | 12/1990 | Canada . |
| 2080842 | 2/1991 | Canada . |
| 2093615 | 7/1993 | Canada . |
| 2099460 | 8/1994 | Canada . |

*Primary Examiner*—Tamara L. Graysay
*Assistant Examiner*—Frederick L. Lagman
*Attorney, Agent, or Firm*—Robert A. Wilkes

[57] ABSTRACT

A process in which a calcining step is used to provide a stable clinker containing the EAF dust. The clinker meets all of the applicable leaching standards. It also appears to be possible to use largely oxidic wastes from other processes, such as zinc electroplating residues, and the largely oxidic residues from refuse fuelled power generators. In this low temperature vitrification process a powder composition containing from 20% to 63% by weight waste material, from 30% to 73% by weight silica, and from 7% to 30% by weight alumina, is wetted to form a homogenous mass. The mass is fired in a furnace for a sufficient time and to a temperature of less than about 1,300° C. to cause vitrification; and the vitrified product is recovered as a fired clinker. The clinker, after crushing, can be used as a road aggregate, in tarmac mixes, or after crushing to a suitably small powder, in the making of bricks and tiles having good abrasion and heat resistance.

17 Claims, 1 Drawing Sheet

EAF DUST TREATMENT

BACKGROUND OF THE INVENTION

This invention is concerned with a method of treating EAF dust.

In the electric arc furnace, or EAF, process used to make various grades of steel a considerable amount of dust, known as EAF dust, is generated. In addition to containing iron oxides derived from the steel making process, the dust also contains significant amounts of toxic substances, such as compounds of lead, cadmium, chromium and other heavy metals. Since these toxic substances are contained in the dust in a potentially soluble condition, EAF dust has to be treated as a toxic material for waste disposal purposes. It cannot, for example, be dumped in a landfill site.

Several proposals have been made for overcoming the toxicity problems associated with EAF dust.

Sresty, in U.S. Pat. No. 5,013,532, describes a process to recover at least some of the valuable metals in the dust. This process does not address the toxic waste problem.

Frame, in CA 2,093,615, proposes to include calcined EAF dust in an otherwise conventional brick. Although the brick meets the applicable leaching standards, significant amounts of zinc and lead are fumed off in the calcination step, and inclusion of the dust in the brick mix has an adverse effect on the mechanical properties of the brick.

Hoffman et al, in U.S. Pat. No. 5,186,742, describes a method in which the dust is made into pellets, which are safe to store, and which are returned to the process. By returning the dust in this fashion, Hoffman seeks to obtain in the end a dust which contains sufficiently high amounts of elements such as lead and zinc to enable processing it to recover those metals. No comment appears to be made on the influence of recycling the dust in this way on the steel making process.

Lymm et al, in U.S. Pat. No. 4,911,757 and Smith, in U.S. Pat. No. 5,245,122 describe methods in which the dust is incorporated into a cementitious system including things such as lime kiln dust, fly ash, ferrous sulphate, and hydrated lime, to which water is added to make the cement. The set cement product is alleged to meet the applicable leaching standards. However, until the setting process is completed the dry material continues to be a toxic hazard, which will complicate both storage, shipping, and mixing.

Richards, in CA 2,080,842, describes a specialised glass making furnace in which materials such as EAF dust can be included in making borosilicate glass. There is no comment as to what steps are taken to deal with gasses released from the furnace. Although this method will successfully encapsulate the dust, it is an energy intensive process requiring temperatures in excess of 1,500° C.

Thus there still appears to be a need for a simple, inexpensive process for dealing with EAF dust to render it safe to handle which a steel maker can operate on site using the sort of equipment with which a steel maker is familiar.

BRIEF SUMMARY OF THE INVENTION

This invention seeks to provide such a process in which a calcining step is used to provide a stable clinker containing the EAF dust. The clinker appears to meet all of the applicable leaching standards, for example the test specified by the U.S.A. Environmental Protection Agency. Further, both the apparatus required, a crusher and an ordinary rotary kiln for example, and the additional materials, primarily sources of silica and alumina, are commonly readily available to a steel maker. It also appears to be possible to use largely metal oxide wastes from other processes, such as zinc electroplating residues, and the largely metal oxide residues from refuse fuelled power generators, in this process.

The clinker can be used after crushing to a suitable size as a road making aggregate, or it can be crushed to a suitable powder size and used as a component in making bricks and tiles, which are themselves of use to the steel maker.

In its broadest embodiment this invention seeks to provide a process for the low temperature vitrification of a metal oxide containing waste material comprising the steps of:

(i) forming a powder composition having a softening temperature of below about 1300° C. containing from 20% to 63% by weight waste material; from 30% to 73% by weight silica; and from 7% to 30% by weight alumina;

(ii) adding to the composition sufficient water to form a substantially homogenous mass;

(iii) transferring the homogenous mass to a furnace;

(iv) heating the homogenous mass in the furnace for a sufficient time and to a temperature of less than about 1,300° C. to cause vitrification; and (v) recovering the vitrified product in the form of a fired clinker.

Preferably, the waste material is EAF dust.

Preferably the temperature is in the range of from about 1,000° C. to about 1300° C.; most preferably the temperature is in the range of from about 1,000° C. to about 1,250° C.

Preferably the composition in step (i) contains about 50% by weight waste material.

Preferably the silica and alumina used in step (i) comprises a clay, or a mixture of sand and clay.

Preferably the homogenous mass is subjected to a pelletisation or moulding step prior to transfer to the furnace.

DESCRIPTION OF THE DRAWING

The invention will now be discussed with reference to FIG. 1, which shows in diagrammatic form the useable composition ranges.

DETAILED DESCRIPTION OF EMBODIMENTS OF THE INVENTION

Figure 1:
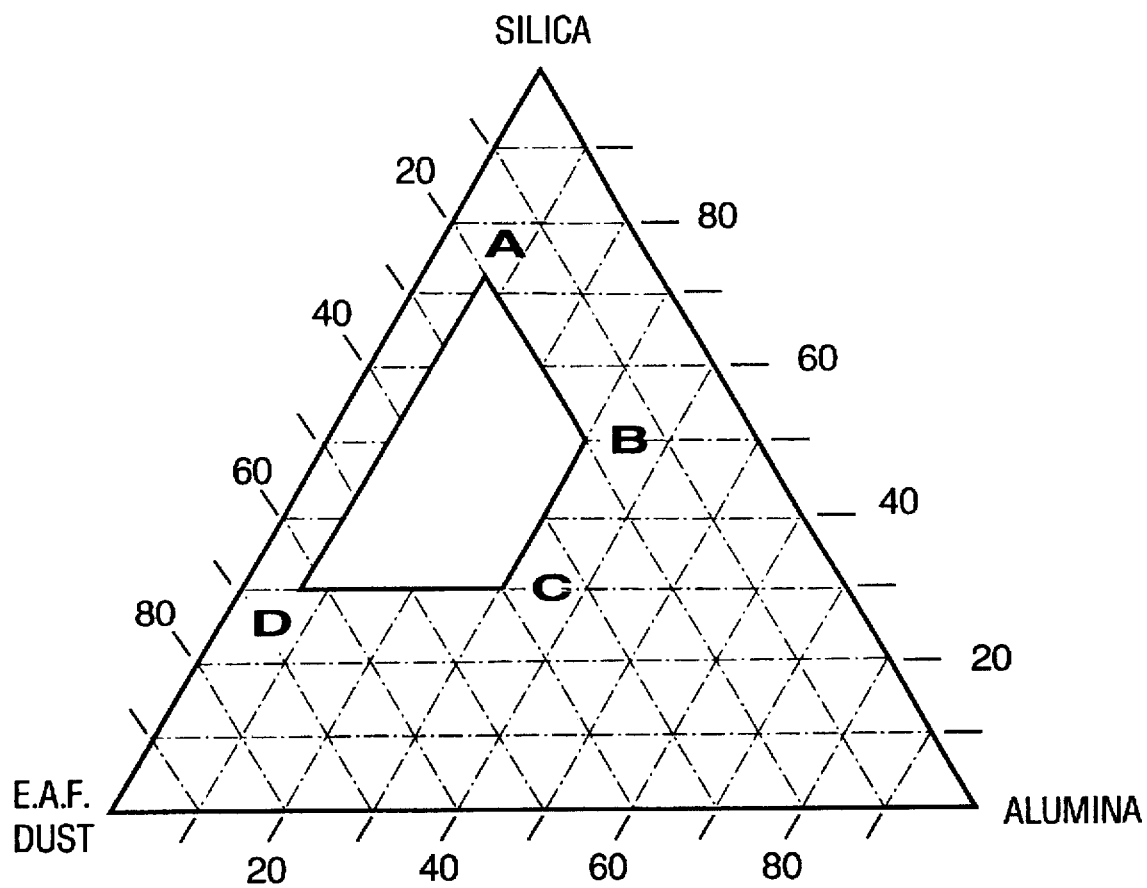

In the following description, all references to percentages are to percentages by weight.

In step (i) a powder composition is formed. Preferably all of the components are powders substantially passing a standard 325 mesh sieve. A small proportion of larger material can be tolerated but should be avoided. Neither the silica nor the alumina need to be pure materials. Any readily available source of silica, alumina, and/or alumino-silicates can be used, such as clays, silica fume, recycled silica brick, alumina dust, bauxite, and sand. Each of these would be characterised thermally and chemically before use.

The precise amounts of each of the components to be used depends on the properties of the oxidic waste material. Generally there is some flexibility, as will discussed in more detail below. For example, for EAF dusts a system containing about 50% dust, about 40% clay and about 10% silica sand is usually satisfactory. Pyrometric test cones are used to determine the suitability of a the chosen powder mix.

In step (ii) sufficient water is added to enable the wetted composition to be handled and transferred to the furnace in step (iii) by ordinary feed devices. The water is added slowly, with mixing, until a suitable consistency is attained. As the water is added, the wetted powder forms into lumps of around 2 cm to 4 cm size which can be fed directly to the furnace. Alternatively, sufficient water is added to permit pelletisation by extrusion to a size of about 1.5 cm length and diameter, or to permit moulding into shapes such as briquettes, small slabs, and the like. These procedures are well known steps in preparing powder materials for firing in a furnace.

In step (iv) the wetted mass is fired to provide the clinker. Any conventional furnace capable of providing both a long enough dwell time for the vitrification step to be completed, and a temperature sufficient to do this, can be used. As is described in more detail below, pyrometric test cones are used to determine the required furnace conditions. Although it is preferred to use a continuously fed rotary furnace, which is a type of furnace generally available to a steel maker, other types of furnace, including batch furnaces, are equally appropriate.

In step (v) the fired clinker, which is safe to handle and does not present a toxic hazard, is collected in any suitable way. The clinkers are dense, very low porosity, polycrystalline ceramics. Because of this physical nature, the clinkers have excellent wear resistance, stress resistance and heat resistance, although the heat resistance is not sufficient for powdered clinker to be used as a component in making firebricks.

In typical examples, the process of this invention has been applied to EAF dusts having the compositions in Tables 1 and 2. Unless otherwise indicated, in the Tables the figure given is for the percentage amount of the element as such found to be present.

TABLE 1

Analysis of Carbon Steel EAF Dust.

| | Sample #1 | Sample #2 |
|---|---|---|
| Fe | 14.0 | 23.0 |
| P | 0.04 | 0.05 |
| MnO | 1.05 | 3.60 |
| $SiO_2$ | 2.50 | 2.19 |
| $Al_2O_3$ | 0.79 | 0.66 |
| CaO | 52.70 | 22.10 |
| MgO | 3.49 | 1.56 |
| $Cr_2O_3$ | 0.14 | 0.25 |
| Zn | 5.14 | 17.40 |
| Na | 0.53 | 1.80 |
| $TiO_2$ | 0.08 | 0.05 |
| K | 0.32 | 0.17 |
| C | 5.37 | 0.61 |
| Cd | 0.016 | 0.04 |
| Pb | 1.03 | 2.91 |

TABLE 2

Analysis of Stainless Steel EAF Dust.

| $Fe_2O_3$ | 42.5 |
|---|---|
| MnO | 6.3 |
| $SiO_2$ | 2.6 |
| $Al_2O_3$ | 0.6 |
| CaO | 5.9 |
| MgO | 4.6 |
| $Cr_2O_3$ | 15.1 |
| ZnO | 6.5 |
| $Na_2O$ | 1.3 |
| $K_2O$ | 1.4 |
| PbO | 1.1 |
| $Ni_2O_3$ | 5.7 |

These analyses show clearly the variability of EAF dust even when substantially the same grade of steel is being made.

In order to determine the required vitrification temperature, pyrometric test cones were made from a mixture of 50% stainless steel dust, 40% clay, and 10% silica sand. The clay contained 60% silica, 35% alumina, and 5% impurities. This composition was found to vitrify at about 1140° C., and to soften at about 1175° C. A suitable furnace temperature for this composition incorporating stainless steel EAF dust is therefore 1140° C. In a similar test using carbon steel dust sample #2 the composition was found to vitrify at about 1080° C., and to soften at about 1180° C. A suitable furnace temperature for this composition containing carbon steel EAF dust is therefore about 1080° C.

The results of pyrometric cone tests made with other mixtures are shown in Tables 3 and 4; in Table 3 stainless steel EAF dust was used, and in Table 4 carbon steel dust sample #2. The temperature given is the softening temperature; the vitrification temperature is somewhat lower.

TABLE 3

| Sample | $Al_2O_3$ % | $SiO_2$ % | Dust % | T °C. |
|---|---|---|---|---|
| A | 10 | 70 | 20 | 1445 |
| B | 10 | 50 | 40 | 1270 |
| C | 10 | 30 | 60 | 1215 |
| D | 23 | 43 | 34 | 1225 |
| E | 30 | 50 | 20 | 1505 |
| F | 30 | 30 | 40 | 1240 |
| G | 50 | 30 | 20 | 1650 |

Comparison of the temperature values in Table 3 with FIG. 1 shows that even though Samples A, E, and G lie inside the operable area indicated by ABCD, the required temperature value is too high.

TABLE 4

| Sample | $Al_2O_3$ % | $SiO_2$ % | Dust % | T °C. |
|---|---|---|---|---|
| H | 10 | 70 | 20 | 1385 |
| J | 10 | 50 | 40 | 1060 |
| K | 10 | 30 | 60 | 1070 |
| L | 23 | 43 | 34 | 1180 |
| M | 30 | 50 | 20 | 1250 |
| N | 30 | 30 | 40 | 1310 |
| O | 50 | 30 | 20 | 1300 |

Comparison of the temperature values in Table 4 with FIG. 1 shows that although Sample O lies outside the operable area indicated by ABCD nevertheless it probably is useable. Similarly, although Sample H lies within the area ABCD, the required temperature value is too high.

Bulk samples both of stainless steel dust and clay, and of carbon steel dust sample #2, were made up using 50% dust, 40% of the same clay, and 10% silica sand. After wetting and mixing, the homogenous mass was fired in an electric box furnace in which the temperature was increased slowly to 1140° C. for the stainless steel dust, and to 1080° C. for the carbon steel dust. In both cases a hard vitrified clinker was obtained. Chemical analysis of the materials before and after firing showed no detectable evaporation loss of heavy metals during the firing process.

Leaching tests of clinker derived from EAF dust showed that it meets all applicable standards. For example, comparison with the requirements of the U.S.A. E.P.A. leaching test shows the following. The numbers are all in ppm.

| Element | EPA Limit | Clinker A | Clinker B |
|---------|-----------|-----------|-----------|
| As | 5.0 | <0.002 | <0.03 |
| Cd | 1.0 | <0.002 | <0.04 |
| Cr | 5.0 | <0.003 | <0.07 |
| Pb | 5.0 | <0.002 | <0.40 |

Clinker A is derived from stainless steel EAF dust, and clinker B is derived from carbon steel EAF dust sample According to the present invention as described above in detail, it is possible to obtain a calcined clinker which permits effective utilisation of a range of hitherto difficult to handle potentially toxic materials. The clinker can be converted into a range of potentially commercially useful products, thus relieving the maker of a significant waste disposal problem.

Although the present invention has been described in connection with preferred embodiments, it will be appreciated by those skilled in the art that modifications, additions, substitutions and deletions not specifically described may be made without departing from the spirit and scope of the invention.

The embodiments of the invention in which an exclusive property or privilege is claimed are defined as follows:

1. A process for the low temperature vitrification of a metal oxide containing waste material comprising the steps of:
   (i) forming a powder composition containing from 20% to 63% by weight waste material; from 30% to 73% by weight silica; and from 7% to 30% by weight alumina;
   (ii) adding to the composition sufficient water to form a substantially homogenous mass;
   (iii) transferring the homogenous mass to a furnace;
   (iv) heating the homogenous mass in the furnace for a sufficient time and to a temperature of less than about 1,300° C. to cause vitrification; and
   (v) recovering the vitrified product in the form of a fired clinker.

2. A process according to claim 1 wherein in step (i) the waste material is EAF dust.

3. A process according to claim 1 wherein the composition of step (i) contains about 50% by weight waste material.

4. A process according to claim 1 wherein the silica and alumina used in step (i) are each chosen from the group consisting of clays, silica fume, recycled silica brick, alumina dust, bauxite, and sand.

5. A process according to claim 4 wherein the silica and alumina used in step (i) are chosen from the group consisting of clay, and clay admixed with sand.

6. A process according to claim 1 wherein in step (i) forming the powder composition includes a grinding step.

7. A process according to claim 1 wherein step (ii) includes a moulding step applied to the homogenous mass.

8. A process according to claim 7 wherein the homogenous mass is moulded into a desired shape.

9. A process according to claim 8 wherein the homogenous mass is moulded into a shape chosen from the group consisting of pellets, small slabs, and briquettes.

10. A process according to claim 1 wherein in step (iv) the vitrification temperature is in the range of from about 1,000° C. to about 1300° C.

11. A process according to claim 10 wherein in step (iv) the vitrification temperature is in the range of from about 1,000° C. to about 1250° C.

12. A clinker obtained by vitrifying a mixture of from 20% to 63% by weight of metal oxide containing waste material; from 30% to 73% by weight silica; and from 7% to 30% by weight alumina at a temperature of less than about 1,250° C.

13. A clinker according to claim 12 wherein the metal oxide containing waste material is EAF dust.

14. A clinker according to claim 12 wherein the silica and alumina used are each chosen from the group consisting of clays, silica fume, recycled silica brick, alumina dust, bauxite, and sand.

15. A clinker according to claim 12 wherein the silica and alumina used are chosen from the group consisting of clay, and clay admixed with sand.

16. A clinker according to claim 12 which has been vitrified at a temperature in the range of from about 1,000° C. to about 1300° C.

17. A clinker according to claim 16 which has been vitrified at a temperature in the range of from about 1,000° C. to about 1250° C.

* * * * *